(12) United States Patent
Butrum et al.

(10) Patent No.: US 10,012,556 B1
(45) Date of Patent: Jul. 3, 2018

(54) SYSTEMS AND METHODS FOR MEASURING CLAMPING PRESSURE IN A STEERING KNUCKLE MANUFACTURING DEVICE

(71) Applicant: Toyota Motor Engineering & Manufacturing North America, Inc., Erlanger, KY (US)

(72) Inventors: Thomas J. Butrum, Georgetown, KY (US); Michael W. Miller, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/447,901

(22) Filed: Mar. 2, 2017

(51) Int. Cl.
   *G01L 5/00* (2006.01)
   *G01M 99/00* (2011.01)

(52) U.S. Cl.
   CPC .......... *G01L 5/0076* (2013.01); *G01L 5/0038* (2013.01); *G01M 99/007* (2013.01)

(58) Field of Classification Search
   CPC ....... G01L 5/0076; G01L 5/0038; G01B 7/18; G01M 99/007
   USPC .......................................................... 73/781
   See application file for complete search history.

(56) References Cited

U.S. PATENT DOCUMENTS

| 4,425,776 A * | 1/1984 | Judge, Jr. ................. B21D 3/16 72/16.8 |
| 5,423,217 A | 6/1995 | Himmler et al. |
| 7,357,628 B2 * | 4/2008 | Lee ..................... B29C 45/7653 164/151 |
| 8,684,379 B2 * | 4/2014 | Fuks ....................... B62D 7/18 280/93.512 |
| 8,763,476 B2 | 7/2014 | Woodcock |
| 2008/0197553 A1 * | 8/2008 | Rudaitis ................. B25B 5/122 269/90 |
| 2013/0263674 A1 | 10/2013 | McKiernan et al. |
| 2016/0161381 A1 | 6/2016 | Bandy et al. |
| 2018/0003475 A1 * | 1/2018 | Xue ..................... G01B 5/0009 |

FOREIGN PATENT DOCUMENTS

CN     104849136 A     8/2015

* cited by examiner

*Primary Examiner* — Harshad R Patel
*Assistant Examiner* — Octavia Hollington
(74) *Attorney, Agent, or Firm* — Dinsmore & Shohl LLP

(57) ABSTRACT

A method for testing a steering knuckle manufacturing device is provided. The method includes coupling a clamp testing steering knuckle that includes one or more pressure sensors to the steering knuckle manufacturing device using one or more clamps of the steering knuckle manufacturing device. The clamp testing steering knuckle includes a steering knuckle workpiece and the one or more pressure sensors coupled to the steering knuckle workpiece. The one or more clamps apply a clamping pressure to the clamp testing steering knuckle such that the one or more pressure sensors generate a pressure signal corresponding to the clamping pressure applied by the one or more clamps to the clamp testing steering knuckle. The clamping pressure applied by the one or more clamps is determined based on the pressure signal received from the one or more pressure sensors.

20 Claims, 5 Drawing Sheets

SYSTEMS AND METHODS FOR MEASURING CLAMPING PRESSURE IN A STEERING KNUCKLE MANUFACTURING DEVICE

TECHNICAL FIELD

The present specification generally relates to systems and methods for measuring and analyzing clamping pressures and, more specifically, systems and methods for measuring and analyzing the clamping pressure of a steering knuckle manufacturing device.

BACKGROUND

Milling, or machining, is the process of using rotary cutters to remove material from a workpiece to form various components, for example, vehicle components such as a steering knuckle. Steering knuckles may be manufactured on heavy milling machines having one or more clamps. Steering knuckles may be held in the heavy milling machines by these clamps. Such clamps may require sufficient clamping pressure to hold the steering knuckle in place while tooling. Insufficient clamping pressure could result in unintended relative motion between the mill and the workpiece as the cutting tool imparts a force upon the workpiece. Accordingly, a need exists for methods of monitoring clamping pressure before clamping pressure lowers below a sufficient level.

SUMMARY

In one embodiment, a method for testing a steering knuckle manufacturing device is provided. The method includes coupling a clamp testing steering knuckle that includes one or more pressure sensors to the steering knuckle manufacturing device using one or more clamps of the steering knuckle manufacturing device. The clamp testing steering knuckle includes a steering knuckle workpiece and the one or more pressure sensors coupled to the steering knuckle workpiece. The one or more clamps apply a clamping pressure to the clamp testing steering knuckle such that the one or more pressure sensors generate a pressure signal corresponding to the clamping pressure applied by the one or more clamps to the clamp testing steering knuckle. The clamping pressure applied by the one or more clamps is determined based on the pressure signal received from the one or more pressure sensors.

In another embodiment, a system for measuring clamping pressure includes a clamp testing steering knuckle that includes a steering knuckle workpiece and one or more pressure sensors coupled to the steering knuckle workpiece and communicatively coupled to a pressure reader. A steering knuckle manufacturing device includes one or more clamps. The system further includes one or more processors and one or more memory modules communicatively coupled to the one or more processors. Machine readable instructions are stored in the one or more memory modules that cause the system to perform at least the following when executed by the one or more processors: determine a clamping pressure of the one or more clamps based on a pressure signal from the one or more pressure sensors. The one or more clamps apply the clamping pressure to the clamp testing steering knuckle.

In still another embodiment, a method of determining when a clamping pressure of a steering knuckle manufacturing device is below a target value clamping pressure is disclosed. The method may include steps of coupling a clamp testing steering knuckle to a steering knuckle manufacturing device using one or more clamps, wherein the clamp testing steering knuckle comprises a steering knuckle workpiece modified to include one or more pressure sensors communicatively coupled to one or more adaptors. The method may further include applying a clamping pressure using the one or more clamps to the clamp testing steering knuckle to generate a pressure signal that corresponds to the clamping pressure applied by the one or more clamps of the steering knuckle manufacturing device. Additionally, the method might include communicatively coupling a pressure reader to the one or more pressure sensors through the one or more adaptors and comparing the pressure signal to a target value clamping pressure to determine whether the clamping pressure is above or below the target value clamping pressure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
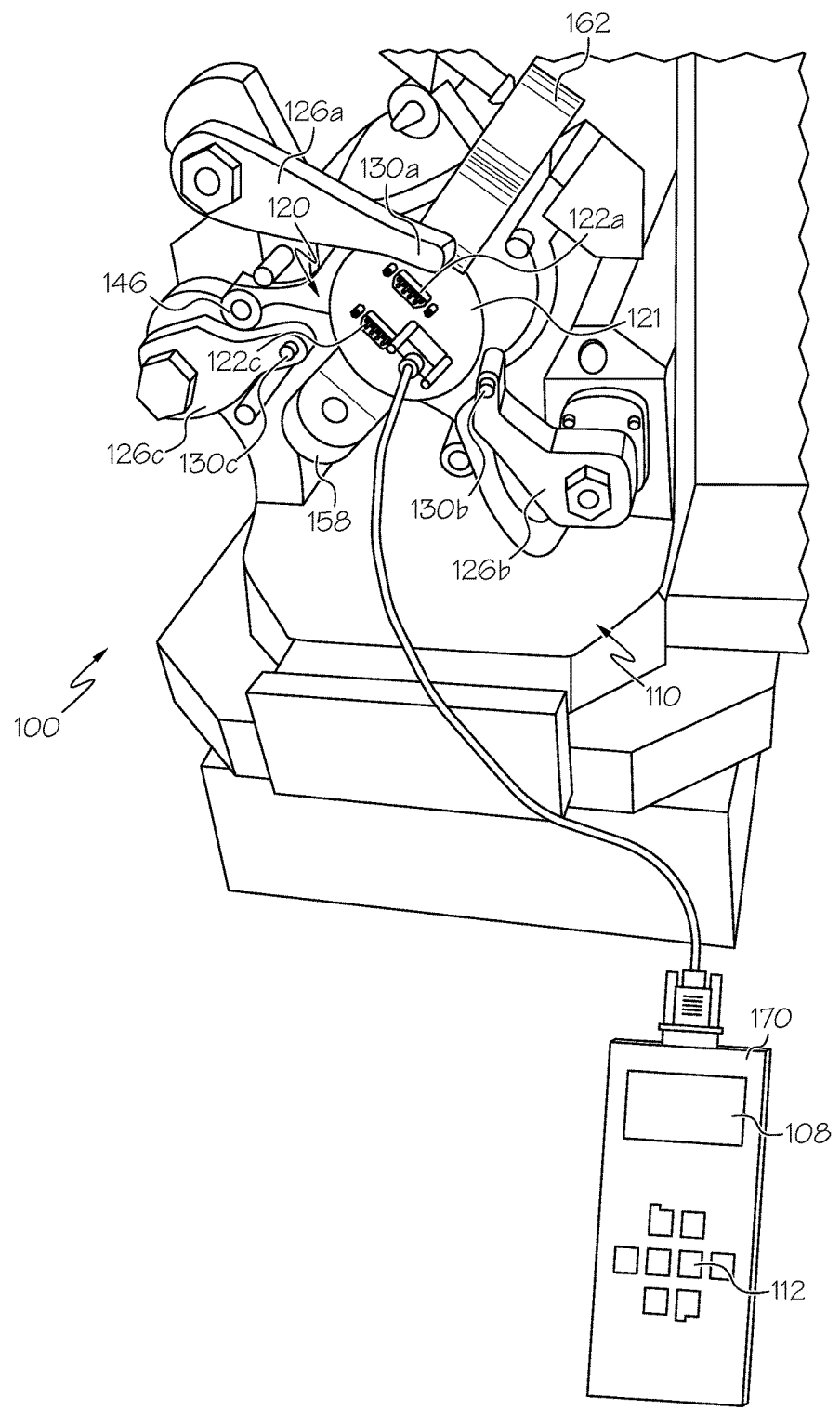
FIG. 1 schematically depicts a perspective view of a clamping pressure measuring device that includes a clamp testing steering knuckle inside a steering knuckle manufacturing device and communicatively coupled to a pressure display device, according to one or more embodiments shown and described herein.

The embodiments disclosed herein include systems and methods for measuring the clamping pressure applied to a clamp testing steering knuckle by a steering knuckle manufacturing device. Referring generally to FIG. 1, the systems and methods include a manufacturing device testing system that includes a steering knuckle manufacturing device and a clamp testing steering knuckle. The steering knuckle manufacturing device includes one or more clamps engageable with a steering knuckle workpiece when manufacturing the steering knuckle workpiece into a steering knuckle and engageable with the clamp testing steering knuckle when testing the steering knuckle manufacturing device. Further, the clamp testing steering knuckle is a modified version of the steering knuckle work piece that includes one or more pressure sensors configured to measure a clamping pressure applied by the one or more clamps.

As used herein, a "steering knuckle workpiece" is a manufacturing workpiece configured to be modified into a steering knuckle by one or more steering knuckle manufacturing devices. While specific embodiments of a steering knuckle workpiece are shown and described herein, the steering knuckle workpiece may comprise a manufacturing workpiece configured to be machined into a steering knuckle at any stage of the manufacturing process. For example, the steering knuckle workpiece may be manufactured (e.g., milled, pressed, stamped, cut, or the like) by a plurality of steering knuckle manufacturing devices such that the steering knuckle workpiece may have a different shape after modification by each of the plurality of steering knuckle manufacturing devices. Moreover, as the clamp testing steering knuckle is a modified version of the steering knuckle workpiece, it should be understood that the clamp testing steering knuckle may be a modified version of any shape steering knuckle workpiece at any stage of manufacture, such that the clamp testing steering knuckle may be used to test any of the plurality of steering knuckle manufacturing devices used to manufacture the steering knuckle workpiece into a steering knuckle.

A steering knuckle (spindle, vehicle knuckle, etc.) is a component of the suspension of a vehicle. The steering knuckle attaches the wheel and brake assemblies to the vehicle and allows the front wheels to move relative to the vehicle (i.e., vertically, turn, rotate). Steering knuckles may include cast metal and may include a bore milled through their center. The central bore is configured to couple to the vehicle wheel hub. Steering knuckles function to couple a hub of a vehicle wheel to the front suspension and steering column of the vehicle. In operation, a steering knuckle may be controlled directly by the steering linkage system of the vehicle. For example, a steering rod may attach to the steering knuckle to control the steering of the vehicle.

Referring now to FIG. 1, a manufacturing device testing system 100 that comprises a steering knuckle manufacturing device 110 and a clamp testing steering knuckle 120 is depicted. The steering knuckle manufacturing device 110 may be any manufacturing device used to manufacture a steering knuckle workpiece 140 into a steering knuckle such that the finished steering knuckle may be installed into the suspension system of a vehicle. To manufacture the steering knuckle, the steering knuckle workpiece 140 may be modified by one or more steering knuckle manufacturing devices 110. As non-limiting examples, the steering knuckle manufacturing device 110 may include a vertical mill, a horizontal mill, a vertical machining center, a horizontal machining center, a lathe, or the like. In some embodiments, the steering knuckle manufacturing device 110 includes a cutting device, such as a rotary cutter configured to remove material from the steering knuckle workpiece 140.

The clamp testing steering knuckle 120 is configured to test the clamping pressure of the clamps 126a-126c of the steering knuckle manufacturing device 110. The clamp testing steering knuckle 120 may be a modified version of the steering knuckle workpiece 140 modified to have one or more pressure sensors 124a-124c (FIG. 5) coupled to the steering knuckle workpiece 140 such that when the clamp testing steering knuckle 120 is positioned within the steering knuckle manufacturing device 110, the one or more clamps 126a-126c apply a clamping pressure to the one or more pressure sensors 124a-124c. The pressure sensors 124a-124c may comprise piezoelectric sensing devices, capacitive sensing devices, or optical sensing devices. The one or more clamps 126a-126c may also apply the clamping pressure to the clamp testing steering knuckle 120 which may be configured to measure the clamping pressure applied by the clamps 126a-126c to the clamp testing steering knuckle 120.

During a manufacturing operation, steering knuckle workpieces 140 may be held within the steering knuckle manufacturing device 110 by clamps 126a-126c or other suitable device configured to inhibit unwanted relative motion between the steering knuckle manufacturing device 110 and the steering knuckle workpiece 140. Clamp arm attachments 130a-130c may couple the clamps 126a-126c to the clamp testing steering knuckle 120 at one or more locations. Clamps 126a-126c may use hydraulic cylinders and/or hydraulic pressure to generate the clamping pressure needed to hold a steering knuckle workpiece 140 or other workpiece in place. Repeated use of the steering knuckle manufacturing device 110 may cause the clamping pressure applied by the clamps 126a-126c to degrade. A change in applied clamping pressure may alter one or more machining operations performed by the steering knuckle manufacturing device 110, leading to undesirable results.

Excessive movement of a steering knuckle workpiece 140 within the steering knuckle manufacturing device 110 can lead to improperly milled steering knuckles as unwanted contact between the cutter or other machine tool of the steering knuckle manufacturing device 110 and the steering knuckle workpiece 140 may cause unintended relative motion between the steering knuckle workpiece 140 and the steering knuckle manufacturing device 110. Unintended relative motion can result in cuts or other modifications outside of a cutting pattern possibly resulting in exceeding design tolerance limits.

Routine monitoring of the clamping pressure applied by the clamps 126a-126c may prevent manufacturing defects or exceeding manufacturing tolerance limits while manipulating steering knuckle workpieces 140 in steering knuckle manufacturing devices 110. This can result in increased production efficiency and can prevent wasted production time and resources producing parts with manufacturing defects. It might also help prevent parts having manufacturing defects outside tolerances from reaching a final product. Various systems and methods for measuring steering knuckle manufacturing device 110 clamping pressure will be described in more detail herein with specific reference to the corresponding drawings.

Figure 2:
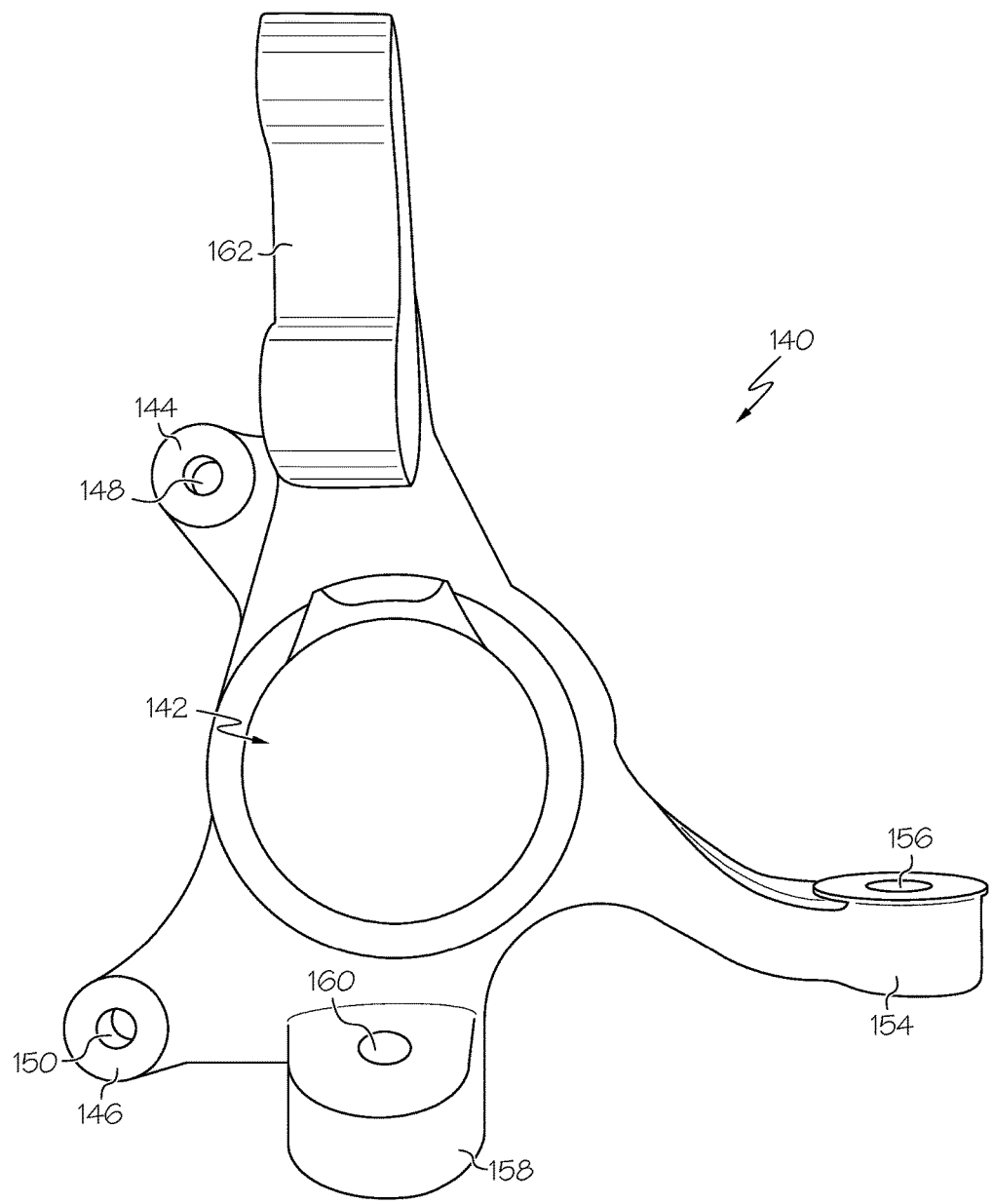
FIG. 2 depicts a steering knuckle workpiece, according to one or more embodiments shown and described herein.

Briefly referring to FIG. 2, embodiments of the steering knuckle workpiece 140 may include a central bore 142, an upper brake caliper attachment tab 144, and a lower brake caliper attachment tab 146. The upper brake caliper attachment tab 144 includes an upper brake caliper bore 148 and the lower brake caliper attachment tab 146 includes a lower brake caliper bore 150 for connecting the brake caliper to the resultant steering knuckle machined from the steering knuckle workpiece 140 when the resultant steering knuckle is installed on a vehicle front-end suspension. Additionally, certain embodiments of the steering knuckle workpiece 140 may include a ball joint tab 152 for coupling the resultant steering knuckle to a ball joint assembly.

Particular embodiments of the steering knuckle workpiece 140 may include a steering arm attachment tab 154. The steering arm attachment tab 154 may include a steering arm attachment bore 156 for coupling the steering arm attachment tab 154 to a steering assembly. The steering assembly may be used to steer a vehicle. Additionally, embodiments may include a ball joint tab 158 for connecting the steering knuckle workpiece 140 to the ball joint of a vehicle front suspension. The ball joint tab 158 may include a ball joint bore 160 for coupling the ball joint tab 158 to a ball joint. The steering knuckle workpiece 140 may further include a shock strut connection tab 162 for coupling the steering knuckle to the shock strut of a vehicle.

Figure 4A:
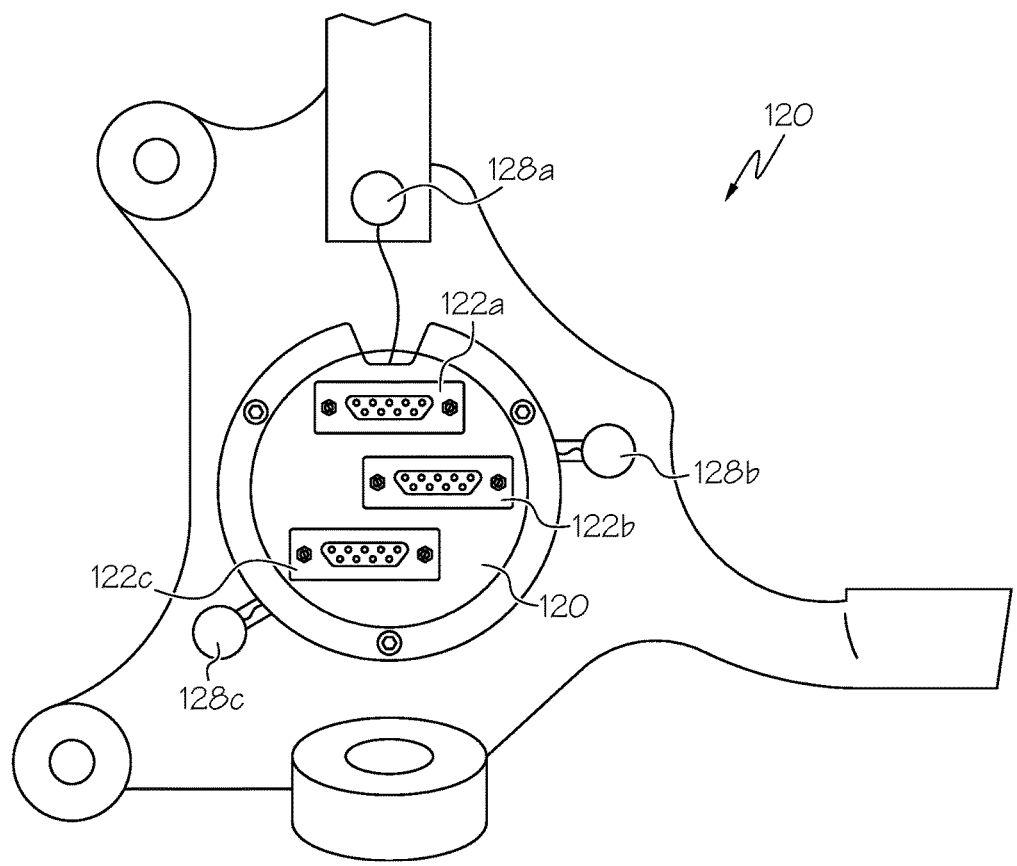
FIG. 4A schematically depicts a frontal view of a clamp testing steering knuckle, according to one or more embodiments shown and described herein.
Figure 4B:
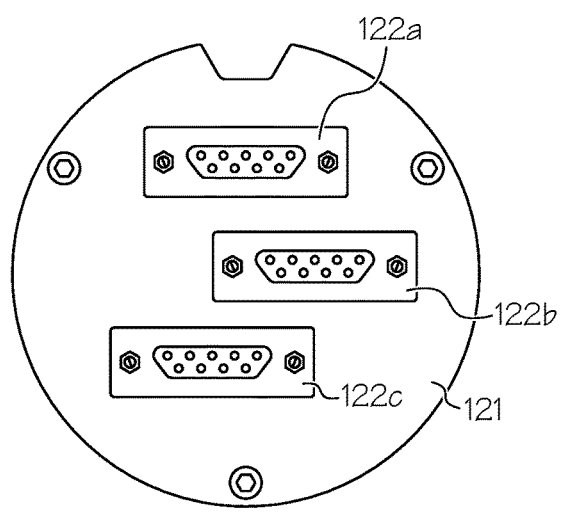
FIG. 4B schematically depicts a circular bore face plate having a plurality of sensor connection locations, according to one or more embodiments shown and described herein.

As mentioned, the steering knuckle workpiece 140 may include a central bore 142. In steering knuckle workpieces 140 modified to serve as clamp testing steering knuckles 120 (FIG. 1), the central bore 142 may serve as a storage location for storing excess wiring connecting the one or more adaptors 122a-122c (FIGS. 1, 4A, 4B, 5) and the pressure sensors 124a-124c (FIG. 5) and/or for placing a faceplate 121 (FIGS. 4A, 4B).

Referring back to FIG. 1, the clamp testing steering knuckle 120 may include a faceplate 121 supporting one or more adaptors 122a-122c that are communicatively coupled to the one or more pressure sensors 124a-124c (FIG. 5) to a pressure reader 170. In some embodiments, the adaptors 122a-122c may comprise DB9 connections. The pressure reader 170 may be communicatively coupled to the pressure sensors 124a-124c using a wire or other suitable means for sending data from the pressure sensor 124a-124c to the pressure reader 170. The pressure reader 170 may be configured to display a value representing the magnitude of the clamping pressure imparted by the clamps 126a-126c of the steering knuckle manufacturing device 110.

Further, the pressure sensors 124a-124c may be communicatively coupled to the meter and screen of a pressure reader 170, which may display the clamping pressure applied by the clamps 126a-126c, so the clamping pressure can be compared to a target value clamping pressure to determine whether the clamping pressure is within a desired target value clamping pressure range. The difference between the clamping pressure applied by the clamps and the target value clamping pressure may be indicative of a clamping quality. While not intending to be limited by theory, when the clamping pressure is within a target value clamping pressure range, the clamping pressure is suitable for use in a steering knuckle manufacturing device 110 to machine a steering knuckle workpiece 140. When the clamping pressure is outside the target value clamping pressure range, for example, the clamps 126a-126c of the steering knuckle manufacturing device 110 may need maintenance.

Figure 3:
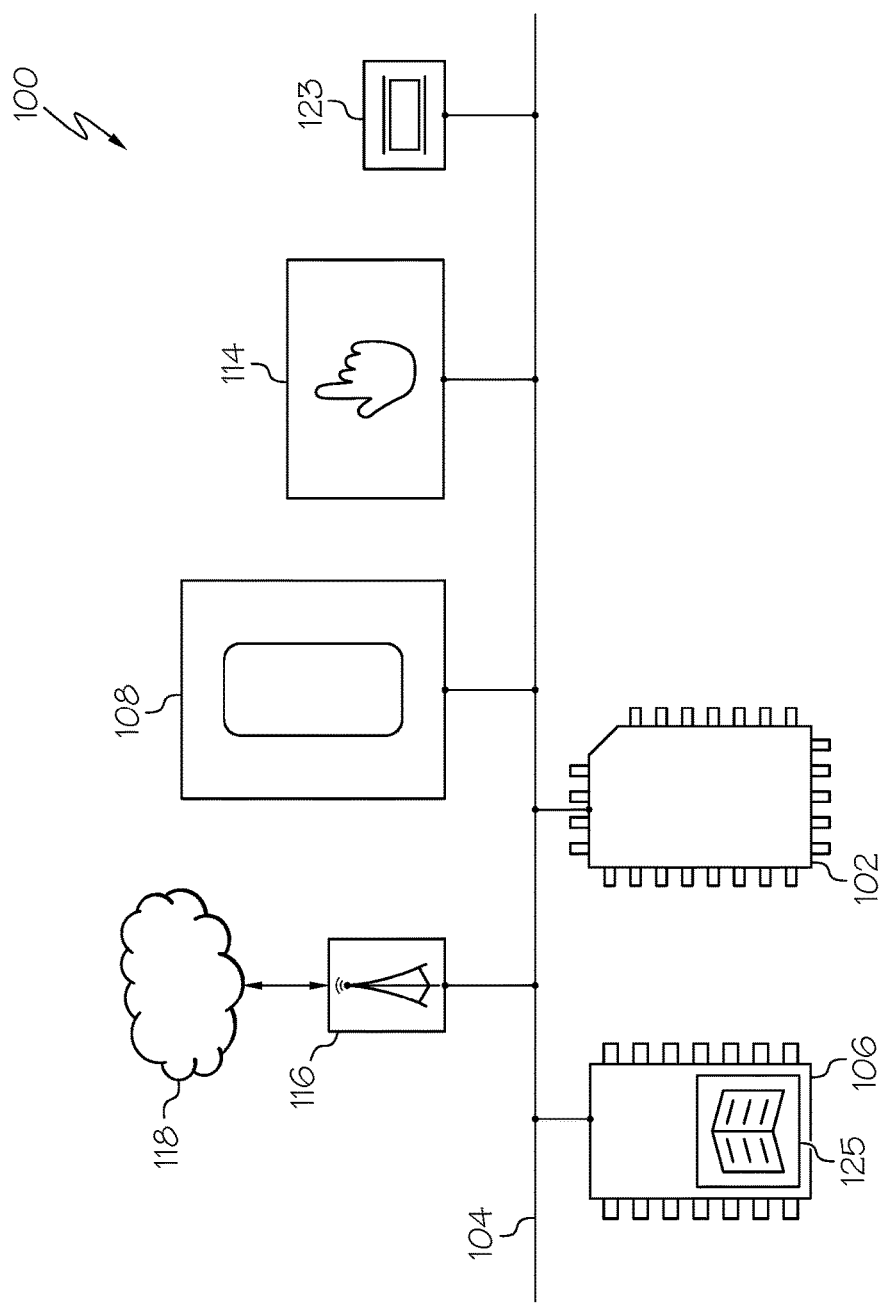
FIG. 3 schematically depicts communicatively coupled components of the manufacturing device testing system of FIG. 1, according to one or more embodiments shown and described herein.
Figure 5:
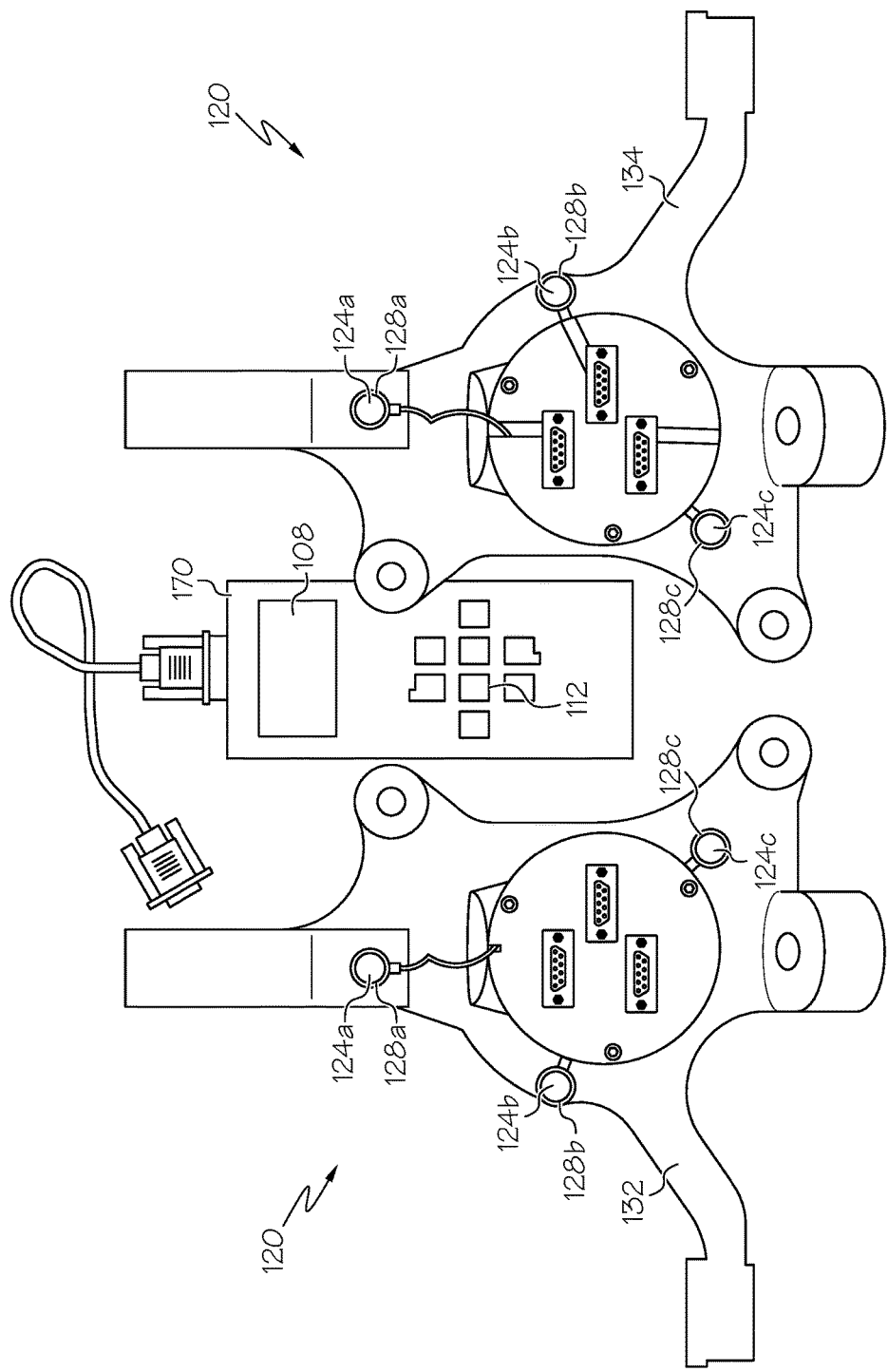
FIG. 5 depicts a left-hand clamp testing steering knuckle and a right-hand clamp testing steering knuckle, according to one or more embodiments shown and described herein.

Referring now to FIG. 3, an embodiment of the manufacturing device testing system 100 is schematically depicted. It is noted that, while the manufacturing device testing system 100 is depicted in isolation, some or all of the components of the manufacturing device testing system 100 may be included within the clamp testing steering knuckle 120 (FIGS. 1, 4A, 4B, and 5), for example, the one or more adaptors 122a-122c (FIGS. 1, 4A, 4B, 5) of the clamp testing steering knuckle 120 and the one or more pressure sensors 124a-124c (FIG. 5). As depicted in FIG. 3, the manufacturing device testing system 100 comprises one or more processors 102 including any processing component configured to receive information and execute machine readable instructions, such as from one or more memory modules 106 having one or more libraries 125. Accordingly, each of the one or more processors 102 may be a controller, an integrated circuit, a microchip, a computer, or any other computing device. Additionally, in some embodiments, the one or more processors 102, the one or more memory modules 106, and the one or more libraries may be components of the pressure reader 170.

The one or more processors 102 are coupled to a communication path 104 that provides signal interconnectivity between various components of the manufacturing device testing system 100. Accordingly, the communication path 104 may communicatively couple any number of processors 102 with one another, and allow the modules coupled to the communication path 104 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors 102, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 106 are coupled to the communication path 104 and may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 3, the manufacturing device testing system 100 may comprise a display 108 for providing visual output such as, for example, information regarding clamping pressure measurement data. For example, in some embodiments, the display may be a component of the pressure reader 170. The display 108 is coupled to the communication path 104. Accordingly, the communication path 104 communicatively couples the display 108 to other modules of the manufacturing device testing system 100. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display 108. Accordingly, each display 108 may receive mechanical input directly upon the optical output provided by the display 108. Additionally, it is noted that the display 108 may include at least one of the one or more processors 102 and one of the one or memory modules 106. While the manufacturing device testing system 100 includes a display 108 in the embodiment depicted in FIG. 3, the manufacturing device testing system 100 may not include a display 108 in other embodiments. Moreover, in some embodiments, the display 108 may positioned on the pressure reader 170 (FIGS. 1 and 5) or may be positioned on a computer monitor connected to a computer configured to display 108 a clamping pressure output.

Referring still to FIG. 3, the manufacturing device testing system 100 may further comprise a network 118. In one embodiment, the network 118 is a personal area network that utilizes Bluetooth technology. In other embodiments, the network 118 may include one or more computer networks (e.g., a personal area network, a local area network, or a wide area network), cellular networks, and/or satellite networks and combinations thereof. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Additionally, the network 118 may be used to communicatively couple the components of the manufacturing device testing system 100, for example, the steering knuckle manufacturing device 110 (FIG. 1), the pressure reader 170 (FIGS. 1 and 5), and/or the one or more pressure sensors 124a-124c (FIG. 5) schematically represented here by pressure sensor diagram 123.

Still referring to FIG. 3, the manufacturing device testing system 100 may comprise network interface hardware 116. The network interface hardware 116 may be communicatively coupled to the communication path 104 and can be any device capable of transmitting and/or receiving data via a network 118. Accordingly, the network interface hardware 116 may include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. In another embodiment, network interface hardware 116 may include a Bluetooth send/receive module for sending and receiving Bluetooth communications to/from the manufacturing device testing system 100, for example, the steering knuckle manufacturing device 110 (FIG. 1), the one or more pressure reader 170 (FIGS. 1 and 5), and/or the one or more pressure sensors 124a-124c (FIG. 5).

The manufacturing device testing system 100 may further comprise one or more user input devices 114 configured to allow a user to communicate with the components of the manufacturing device testing system 100. The one or more user input devices 114 may be any device capable of transforming user contact into a data signal that can be transmitted over the communication path 104 such as, for example, a keyboard, buttons, switches, knobs, touch-sensitive pads, microphones, and the like. In some embodiments, the one or more user input devices 114 may include a power button, a volume button, an activation button, a scroll button, or the like. The one or more user input devices 114 may be used by the user to complete tasks such as programming preferences or settings, providing commands, providing feedback to the pressure reader 170 (FIGS. 1 and 5) and/or the steering knuckle manufacturing device 110, navigating menus, making selections, and other functionality described herein. In some embodiments, the user input devices 114 may be positioned in or on the steering knuckle manufacturing device 110 (FIG. 1), the pressure reader 170 (FIGS. 1 and 5), and/or any suitable location. It should be understood that some embodiments may not include the user input devices 114.

Referring now to FIG. 4A, a front view of the clamp testing steering knuckle 120 is shown. Some embodiments of the clamp testing steering knuckle 120 may include one or more pressure sensor pockets 128a-128c for placement of pressure sensors 124a-124c (FIG. 5). The pressure sensor pockets 128a-128c may be positioned at the location where a clamp arm attachment 130a-130c (FIG. 1) contacts the clamp testing steering knuckle 120 when the clamp testing steering knuckle 120 is positioned within the steering knuckle manufacturing device 110 such that pressure sensors 124a-124c installed in the pressure sensor pockets 128a-128c are contacted by the clamp arm attachments 130a-130c and the clamping pressure of the clamps 126a-126c can be measured.

The pressure sensor pockets 128a-128c may be drilled or tapped into a steering knuckle workpiece 140 (FIG. 2) to form a clamp testing steering knuckle 120. In particular embodiments, the pressure sensor pockets 128a-128c may be drilled to a depth such that the surface of the pressure sensors 124a-124c (FIG. 5) that contacts the clamp arm attachment 130a-130c (FIG. 1) is flush with the surrounding surface of the steering knuckle workpiece 140 into which the pressure sensor pockets 128a-128c are drilled.

Referring to FIGS. 4A and 4B, the faceplate 121 of the clamp testing steering knuckle 120 may include one or more adaptors 122a-122c. In the embodiment shown, the clamp testing steering knuckle 120 contains three adaptors 122a-122c, but embodiments are not so limited. In some embodiments, adaptors 122a-122c are used to mount a sensor cable or other communicative coupling means to the clamp testing steering knuckle 120 for transmission of a pressure signal from the pressure sensors 124a-124c to the pressure reader 170 (FIGS. 1 and 5). In some embodiments, the adaptors 122a-122c are a Referring now to FIG. 5, a pair of clamp testing steering knuckles 120 are shown, including a left-hand clamp testing steering knuckle 132 and a right-hand clamp testing steering knuckle 134. The left-hand clamp testing steering knuckle 132 simulates a left-hand steering knuckle for measuring the clamping pressures a left-hand steering knuckle will see in the steering knuckle manufacturing device 110 and the right-hand clamp testing steering knuckle 134 simulates a right-hand steering knuckle for measuring the clamping pressures a right-hand steering knuckle will see in the steering knuckle manufacturing device 110. Left-hand and right-hand steering knuckles are designed to connect a vehicle suspension to a vehicle wheel such that relative motion is possible between the components.

In some embodiments, the pressure sensors 124a-124c may comprise a pressure-sensitive, color-changing paper, that changes color based upon a clamping pressure felt by the paper. In such an embodiment, a color-changing paper may be positioned at the location where a clamp arm attachment 130a-130c (FIG. 1) contacts the clamp testing steering knuckle 120. Such an embodiment might test the pressure of the clamps 126a-126c without requiring a pressure reader 170.

Referring again to FIGS. 1-5, the manufacturing device testing system 100 may implement a method for testing the clamping pressure of a steering knuckle manufacturing device 110. The method may be implemented by logic within the machine readable instructions that, when executed by the one or more processors 102, compares the clamping pressure of a steering knuckle manufacturing device 110 to a target value clamping pressure. It is noted that, while the method is described as following a specific sequence, additional embodiments of the present disclosure are not limited to any particular sequence.

Referring still to FIGS. 1-5, testing the clamping pressure of the steering knuckle manufacturing device 110 may include coupling a clamp testing steering knuckle 120 comprising one or more pressure sensors 124a-124c to the steering knuckle manufacturing device 110 using the one or more clamps 126a-126c of the steering knuckle manufacturing device 110. The clamp testing steering knuckle 120 may include a steering knuckle workpiece 140 and one or more pressure sensors 124a-124c coupled to the steering knuckle workpiece 140. The one or more clamps 126a-126c of the steering knuckle manufacturing device may be coupled to the one or more pressure sensors 124a-124c of the clamp testing steering knuckle 120, and the clamps 126a-126c may apply a clamping pressure, that is, a compression force, to the pressure sensors 124a-124c such that the pressure sensors 124a-124c generate a pressure signal corresponding to the clamping pressure applied by the clamps 126a-126c to the pressure sensors 124a-124c. The clamping pressure may be determined by reading the display of a pressure reader 170 and the clamping pressure may be compared to a target value clamping pressure.

In some embodiments of the method, the clamp testing steering knuckle 120 may be coupled to the steering knuckle manufacturing device 110 at locations corresponding to the locations used to couple a steering knuckle workpiece 140 to the steering knuckle manufacturing device 110. Also, the steering knuckle workpiece 140 may be modified to include one or more pressure sensor pockets 128a-128c milled from the steering knuckle workpiece 140 for surrounding the one or more pressure sensors 124a-124c. In some embodiments of the method, the locations of the one or more pressure sensor pockets 128a-128c may correspond to the one or more locations used to couple a steering knuckle workpiece 140 to the steering knuckle manufacturing device 110.

In some embodiments of the method, the clamps 126a-126c of the steering knuckle manufacturing device 110 may be pressurized using hydraulic pressure. Each clamp 126a-126c may be individually pressurized using one or more hydraulic cylinders. In some embodiments, the pressure displayed on the pressure reader 170 may correspond to the internal pressure of the hydraulic cylinder. In some embodiments, the internal pressure of the hydraulic cylinder may be compared to a target value clamping pressure to determine whether or not the internal pressure is above or below the target value clamping pressure. In some embodiments of the method, when the internal hydraulic pressure is below the target value clamping pressure, the hydraulic cylinder may be replaced with a hydraulic cylinder having an internal pressure above the target value clamping pressure such that the steering knuckle manufacturing device maintains clamping pressure at or near the target value clamping pressure.

In some embodiments, the target value clamping pressure may comprise a range of values making up a target value clamping pressure range. The target value clamping pressure range may be set such that when a steering knuckle manufacturing device 110 has completed manufacturing a steering knuckle workpiece 140, the various cuts and machining completed on the steering knuckle workpiece 140 are all within design tolerance. In some embodiments of the method, clamping pressure may be measured when the cuts and machining on a steering knuckle workpiece 140 that has been completely manufactured exceed tolerance. In some embodiments of the method, the clamping pressure may be measured after the machining of a certain number of steering knuckle workpieces 140. In some embodiments of the method, the clamping pressure may be measured on a set time schedule, such as, for example, every 7 days, or once a month. In some embodiments of the method, clamping pressure may be monitored randomly. In some embodiments of the method, clamping pressure may be monitored as a function of various factors, for example, a combination of the various factors listed above.

In some embodiments of the method, target value clamping pressure range is a function of which pressure sensor 124a-124c is being measured. That is, depending on which clamp 126a-126c is applying the pressure, there may be a different target value clamping pressure. In some embodiments, the target value clamping pressure may be measured or displayed as a force, for example, by multiplying the measured clamping pressure by the area that is being pressed. In some embodiments, the area being pressed may comprise a face of the pressure sensor 124a-124c.

It should be understood that embodiments described herein provide for systems and methods of measuring the clamping pressure of the clamps of a steering knuckle manufacturing device so as to maintain the clamping pressures within a target value clamping pressure range to improve the manufacturing of steering knuckles. This may include determining a target value necessary to maintain sufficient cutting tolerances during manufacturing of a steering knuckle, applying clamping pressure to one or more pressure sensors communicatively coupled to a pressure reader through the clamps of a steering knuckle manufacturing device, and comparing the clamping pressure to a target value clamping pressure. The system and methods described herein may increase the efficiency and accuracy of steering knuckles, and may reduce the amount and frequency of testing of steering knuckles after they have been assembled. Thus, the monitoring of clamping pressure and replacement of parts necessary to maintain sufficient clamping pressure in vehicle knuckle manufacturing devices may lead to reductions in cost and time required to produce vehicle knuckles.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for testing a steering knuckle manufacturing device, the method comprising:
    coupling a clamp testing steering knuckle comprising one or more pressure sensors to the steering knuckle manufacturing device using one or more clamps of the steering knuckle manufacturing device, wherein:
        the clamp testing steering knuckle comprises a steering knuckle workpiece and the one or more pressure sensors coupled to the steering knuckle workpiece; and
        the one or more clamps apply a clamping pressure to the clamp testing steering knuckle such that the one or more pressure sensors generate a pressure signal corresponding to the clamping pressure applied by the one or more clamps to the clamp testing steering knuckle; and
    determining the clamping pressure applied by the one or more clamps based on the pressure signal provided by the one or more pressure sensors.

2. The method of claim 1 further comprising communicatively coupling the one or more pressure sensors to a pressure reader, the pressure reader determining the clamping pressure based on the pressure signal.

3. The method of claim 1 further comprising comparing the clamping pressure to a target value clamping pressure.

4. The method of claim 1, wherein the steering knuckle workpiece is modified to include one or more pressure sensor pockets and the one or more pressure sensors are positioned within the one or more pressure sensor pockets.

5. The method of claim 4, wherein the one or more pressure sensor pockets extend into a single side of the steering knuckle workpiece.

6. The method of claim 4 further comprising determining a number of pressure sensors coupled to the clamp testing steering knuckle based on a number of clamps on the steering knuckle manufacturing device.

7. The method of claim 6, wherein the number of pressure sensors coupled to the clamp testing steering knuckle equals the number of clamps of the steering knuckle manufacturing device.

8. The method of claim 1, wherein the one or more clamps of the steering knuckle manufacturing device couple to the clamp testing steering knuckle at the one or more pressure sensors.

9. The method of claim 1 further comprising displaying the clamping pressure applied by the one or more clamps on a display communicatively coupled to the one or more pressure sensors.

10. A system for measuring clamping pressure comprising:
    a clamp testing steering knuckle comprising:
        a steering knuckle workpiece;
        one or more pressure sensors coupled to the steering knuckle workpiece and communicatively coupled to a pressure reader;
    a steering knuckle manufacturing device comprising one or more clamps;
    one or more processors;
    one or more memory modules communicatively coupled to the one or more processors; and
    machine readable instructions stored in the one or more memory modules that cause the system to perform at least the following when executed by the one or more processors:
        determine a clamping pressure of the one or more clamps based on a pressure signal from the one or more pressure sensors, the one or more clamps applying the clamping pressure to the clamp testing steering knuckle.

11. The system of claim 10, wherein the clamp testing steering knuckle comprises one or more pressure sensor pockets and the pressure sensors are located within the one or more pressure sensor pockets.

12. The system of claim 11, wherein locations of the one or more pressure sensor pockets correspond to one or more locations at which the steering knuckle manufacturing device couples to the steering knuckle workpiece.

13. The system of claim 12, wherein the clamp testing steering knuckle comprises one or more adaptors for communicatively coupling the one or more pressure sensors with the pressure reader.

14. The system of claim 10, wherein the clamping pressure is compared to a target value clamping pressure.

15. The system of claim 10, wherein the one or more clamps comprise hydraulic clamps having one or more hydraulic cylinders for maintaining hydraulic pressure.

16. The system of claim 10, wherein the one or more pressure sensors comprise piezoelectric sensing devices, capacitive sensing devices, or optical sensing devices.

17. A method of determining when a clamping pressure of a steering knuckle manufacturing device is below a target value clamping pressure comprising:
    coupling a clamp testing steering knuckle to a steering knuckle manufacturing device using one or more clamps, wherein the clamp testing steering knuckle comprises a steering knuckle workpiece modified to include one or more pressure sensors communicatively coupled to one or more adaptors;
    applying a clamping pressure using the one or more clamps to the clamp testing steering knuckle generating a pressure signal that corresponds to the clamping pressure applied by the one or more clamps of the steering knuckle manufacturing device;
    communicatively coupling a pressure reader to the one or more pressure sensors through the one or more adaptors; and
    comparing the pressure signal to the target value clamping pressure to determine whether the clamping pressure is below the target value clamping pressure.

18. The method of claim 17, wherein the target value clamping pressure is a target value clamping pressure range comprising a range of clamping pressures.

19. The method of claim 17, wherein the one or more clamps are pressurized using one or more hydraulic cylinders, such that the hydraulic pressure inside the one or more hydraulic cylinders is determined using the one or more pressure sensors.

20. The method of claim 19 further comprising replacing the one or more hydraulic cylinders if the pressure provided by the one or more hydraulic cylinders is below the target value clamping pressure.

* * * * *